United States Patent
Lee et al.

(10) Patent No.: US 12,479,519 B2
(45) Date of Patent: Nov. 25, 2025

(54) SIDE SPOILER DEVICE FOR MOBILITY

(71) Applicants: Hyundai Motor Company, Seoul (KR); Kia Corporation, Seoul (KR)

(72) Inventors: Hong Heui Lee, Gyeonggi-do (KR); Dong Eun Cha, Gyeonggi-do (KR); Jin Young Yoon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 502 days.

(21) Appl. No.: 17/974,177

(22) Filed: Oct. 26, 2022

(65) Prior Publication Data
US 2023/0182831 A1 Jun. 15, 2023

(30) Foreign Application Priority Data
Dec. 10, 2021 (KR) .......... 10-2021-0176838

(51) Int. Cl.
*B62D 35/00* (2006.01)
(52) U.S. Cl.
CPC ................... *B62D 35/008* (2013.01)
(58) Field of Classification Search
CPC ...... B62D 35/008; B62D 35/02; B62D 37/02; B62D 25/20; Y02T 10/82
See application file for complete search history.

(56) References Cited

U.S. PATENT DOCUMENTS

| 9,994,267 | B1* | 6/2018 | Marmo | B62D 37/02 |
| 10,363,976 | B2* | 7/2019 | Gaylard | B62D 35/008 |
| 2011/0148143 | A1* | 6/2011 | Ondracek | B62D 35/008 296/180.5 |
| 2019/0344837 | A1* | 11/2019 | Toki | B62D 35/001 |
| 2023/0001991 | A1* | 1/2023 | Beierl | B62D 37/02 |
| 2023/0053837 | A1* | 2/2023 | Chung | B62D 35/007 |

FOREIGN PATENT DOCUMENTS

KR   10-2009-0064196 A   6/2009

* cited by examiner

*Primary Examiner* — Peter D Nolan
*Assistant Examiner* — Anwar Mohamed
(74) *Attorney, Agent, or Firm* — Fox Rothschild LLP (57) ABSTRACT

In the present disclosure, the side spoiler is provided on a lower side of a mobility vehicle so that aerodynamic performance is improved, and a deployment angle of the side spoiler is controlled according to driving conditions and road conditions so that desired aerodynamic performance is realized, and damage to the side spoiler is prevented. In addition, introduced is a side spoiler device for the mobility vehicle, in which the side spoiler is divided into a plurality of side spoilers so that aerodynamic performance for each driving situation is optimized through individual control of each side spoiler.

20 Claims, 10 Drawing Sheets

SIDE SPOILER DEVICE FOR MOBILITY

CROSS REFERENCE TO RELATED APPLICATION

The present application claims under 35 U.S.C. § 119(a) the benefit of Korean Patent Application No. 10-2021-0176838, filed Dec. 10, 2021, the entire contents of which is incorporated herein for all purposes by this reference.

1. FIELD OF THE DISCLOSURE

Embodiments of the present disclosure relate to a side spoiler device for a mobility (mobility vehicle), wherein the side spoiler is provided at a lower side of the mobility vehicle to improve aerodynamic performance, and a deployment angle of the side spoiler is controlled according to driving conditions and road conditions.

2. BACKGROUNDS

In general, a mobility vehicle is subjected to air resistance acting during driving, and air resistance is an important factor that accounts for most of driving resistance. In particular, when the air resistance is reduced, fuel efficiency is improved, so reducing the air resistance is essential for electric vehicles, and various aerodynamic improvement technologies for improving fuel efficiency are being developed.

To this end, an air spoiler is installed at the rear of the mobility vehicle to change air flow passing through the mobility vehicle, thereby causing an effect of pressing the mobility vehicle downward to be generated through the air flow flowing around the air spoiler.

In addition, an active air flap is installed in front of the mobility vehicle to be selectively opened or closed according to the driving condition of the mobility vehicle so that the cooling effect of the mobility vehicle is secured, and the air flow is controlled, thereby causing the driving performance of the mobility vehicle to be improved.

In addition, a side skirt is installed on the side of the mobility vehicle to block the air flow that goes out to the outside from the lower part of the mobility vehicle or that flows into the lower side of the mobility vehicle from the outside, thereby causing the straightness of the air flow under the mobility vehicle to be improved and the air resistance applied to the rear tire to be reduced.

Such a side skirt is installed under the mobility vehicle, so there is a problem in that the ground clearance is lowered. Accordingly, there is a problem in that the lower part of the mobility vehicle is damaged due to the low ground clearance caused by the side skirt when the mobility vehicle runs on a slope or goes over a high-speed bump.

In particular, as the side skirt is fixed to the lower part of the mobility vehicle, the ground clearance is lowered in comparison with an advantage that the aerodynamic improvement effect is increased, and thus there is a problem in that there is a restriction in driving.

The foregoing is intended merely to aid in the understanding of the background of the present disclosure and should not be taken as acknowledging that the present disclosure falls within the purview of the related art that is already known to those skilled in the art.

SUMMARY

Accordingly, the present disclosure has been made keeping in mind the above problems occurring in the related art, and an objective of the present disclosure is to provide a side spoiler device for a mobility vehicle in which aerodynamic performance is improved through the side spoiler provided on a lower side of the mobility vehicle and a deployment angle of the side spoiler is controlled according to driving conditions and road conditions so that desired aerodynamic performance is realized, and damage to the side spoiler is prevented.

The side spoiler may extend along a longitudinal direction of the mobility vehicle between a front tire and a rear tire of the lower part of the vehicle body.

In order to achieve the above objective, according to the present disclosure, there may be provided a side spoiler device for a mobility vehicle, the device including: a side spoiler installed to be able to rotate in a lower part of a vehicle body of the mobility vehicle, deployed or stowed in the lower part of a vehicle body and divided into a plurality of side spoilers along a longitudinal direction of the mobility vehicle; a power transfer unit installed in the lower part of a vehicle body, configured to be in a plurality of power transfer units to be connected to each side spoiler, and configured to control a rotational position of the side spoiler; and a controller configured to control the power transfer unit, thereby determining a position of each side spoiler.

The side spoiler may include a first plate and a second plate, wherein the first plate is installed to be able to rotate in the lower part of a vehicle and connected to the power transfer unit, and the second plate is connected to be able to rotate to the first plate.

An accommodation space in which the side spoiler is stowed may be provided in the lower part of a vehicle body, an engaging end may be provided outside the accommodation space, the first plate may be provided to be able to be stowed in the accommodation space, and depending on the rotational position of the first plate, the second plate may be unfolded from the first plate or is tilted, by being in contact with the engaging end, from the first plate.

The second plate may be connected to be able to rotate to the first plate through an elastic means as a medium, whereby an elastic force may be applied to the second plate in a direction unfolded from the first plate.

When the side spoiler is being stowed, the second plate may be brought into contact with the engaging end, thereby being folded to the first plate by being bent, and when the side spoiler is being deployed, an angle of the first plate may be controlled in a state in which the second plate may be separated from the engaging end and unfolded from the first plate.

The first plate may be composed of a rigid material, and the second plate may be composed of a soft material.

The power transfer unit may include: a driver installed in the lower part of a vehicle body and generating rotational power, a power shaft connected to the driver to rotate, and a gear unit connected in gears to the power shaft and the side spoiler so that the side spoiler is rotated by the rotational power of the driver.

The side spoiler may be configured to be divided into at least one front side spoiler and at least one rear side spoiler in the longitudinal direction of the mobility vehicle, and the controller may control the front side spoiler and the rear side spoiler, respectively.

The controller may divide the front side spoiler and the rear side spoiler by a control mode, wherein the control mode may be set into a stowed mode in which the front side spoiler and the rear side spoiler are stowed, a fully deployed mode in which the front side spoiler and the rear side spoiler are deployed vertically downward, and a tilting mode in which the front side spoiler and the rear side spoiler are deployed to be inclined at a predetermined angle.

Driving speed information of the mobility vehicle may be input to the controller, and when driving speed of the mobility vehicle is no less than a predetermined speed, the controller may control the power transfer unit so that the front side spoiler and the rear side spoiler are operated in the fully deployed mode.

In some embodiments, the driving speed information of the mobility vehicle may be input to the controller through a wheel sensor or a speed sensor.

The driving speed information of the mobility vehicle may be input to the controller, and when the driving speed of the mobility vehicle is rapidly decelerated, the controller may control the power transfer unit so that the front side spoiler and the rear side spoiler are operated in the stowed mode and the fully deployed mode, respectively.

In some embodiments, whether or not to brake is input to the controller through a brake sensor.

Road condition information in front of the mobility vehicle may be input to the controller, and in the state in which the front side spoiler and the rear side spoiler are deployed, when there is an obstacle including a mound on a road in a moving direction of the mobility vehicle, the controller may control the power transfer unit so that the front side spoiler and the rear side spoiler are each operated in an optimal tilting mode.

In some embodiments, the road condition may be input to the controller from a camera sensor or GPS.

When the mobility vehicle is driven to be turned in the state in which the front side spoiler and the rear side spoiler are deployed, the controller may control the power transfer unit so that the front side spoiler on an opposite side to a turning direction is operated in an optimal tilting mode.

When the driving speed and turning angle of the mobility vehicle meet a preset condition for being driven to be rapidly turned, the controller may control the power transfer unit, so that the front side spoiler and the rear side spoiler in the turning direction are operated in the fully deployed mode, and the front side spoiler 100a and the rear side spoiler 100b on an opposite side to the turning direction are each operated in the optimal tilting mode.

In some embodiments, information on a turning of the mobility vehicle may be input to the controller through a steering wheel sensor.

As described above, the side spoiler device for a mobility vehicle having a structure as described above is configured such that the side spoiler is provided on a lower side of the mobility vehicle so that aerodynamic performance is improved, and a deployment angle of the side spoiler is controlled according to driving conditions and road conditions so that desired aerodynamic performance is realized, and damage to the side spoiler is prevented. In addition, the side spoiler is configured to be divided into a plurality of side spoilers, so the aerodynamic performance is optimized for each driving situation through individual control of each side spoiler.

As discussed, the method and system suitably include use of a controller or processer.

In another embodiment, vehicles are provided that comprise an apparatus as disclosed herein.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

It is understood that the term "vehicle" or "vehicular" (which includes "mobility vehicle) or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

As referred o herein, the term "mobility" or "mobility vehicle" refers to a vehicle as referred to herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, a side spoiler device for a mobility vehicle according to exemplary embodiments of the present disclosure will be described in detail with reference to the accompanying drawings.

As shown in FIGS. 1 to 4, the side spoiler device for the mobility vehicle according to the present disclosure may include: a side spoiler 100 installed to be able to rotate in a lower part 10 of a vehicle body of the mobility vehicle, deployed or stowed in the lower part 10 of the vehicle body, and divided into a plurality of side spoilers along a longitudinal direction of the mobility vehicle; a power transfer unit 200 installed in the lower part 10 of the vehicle body, configured to be in a plurality of power transfer units to be respectively connected to the side spoilers 100, and configured to control a rotational position of the side spoiler 100; and a controller 300 configured to control the power transfer unit 200, thereby determining the position of each side spoiler 100.

Figure 1:
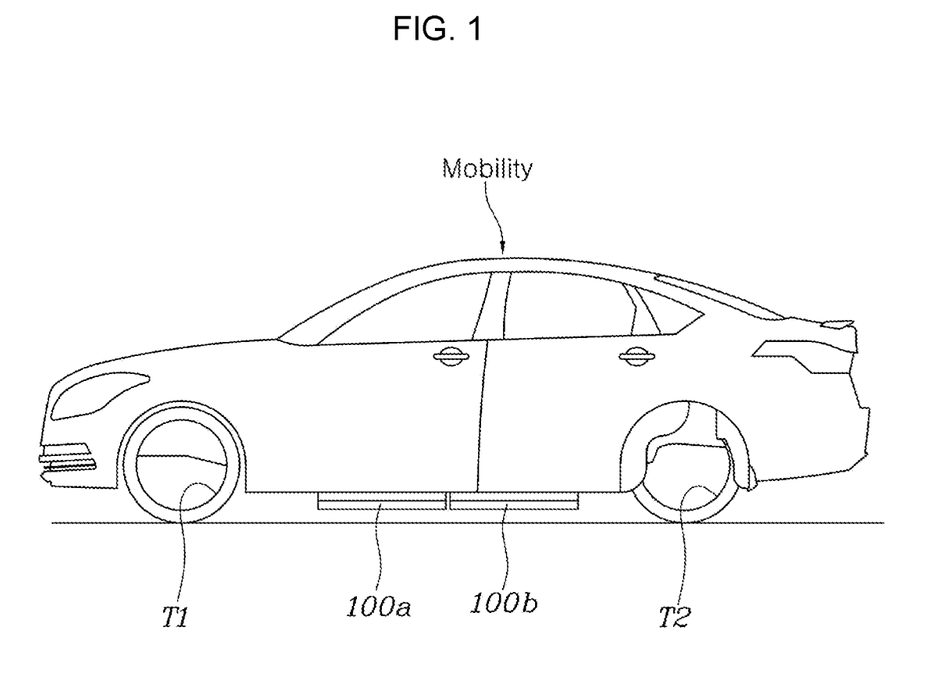
FIG. 1 is a view showing a mobility vehicle provided with a side spoiler device according to the present disclosure.
Figure 2:
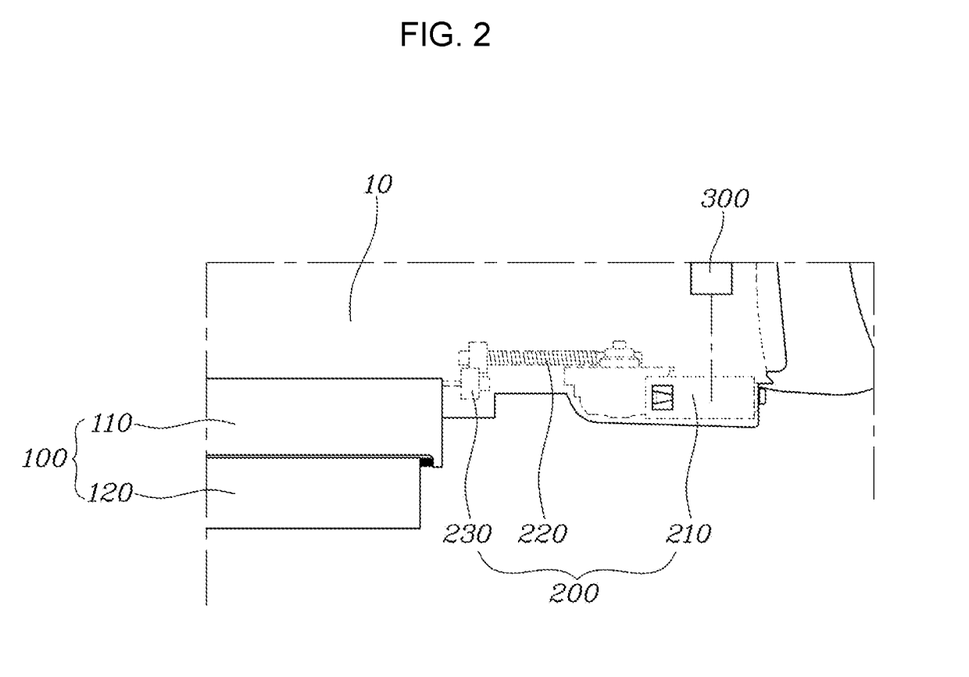
FIG. 2 is a view showing the side spoiler device for the mobility vehicle shown in FIG. 1.

The side spoilers 100 and the power transfer units 200 of the present disclosure may be provided on opposite sides of the mobility vehicle, respectively, may each be divided correspondingly into the plurality of side spoilers or power transfer units along the longitudinal direction of the mobility vehicle, and may each be operated individually.

Such a side spoiler 100 may be provided to extend along the longitudinal direction of the mobility vehicle between a front tire T1 and a rear tire T2 of the lower part 10 of the vehicle body and may be provided in a plate shape, thereby controlling the air flow under the mobility vehicle.

In particular, the side spoiler 100 may be connected to the power transfer unit 200 and installed to be able to rotate at the lower part 10, whereby the side spoiler 100, when rotated downward and deployed, controls the air flow flowing in the lower part 10 of the vehicle so that desired aerodynamic performance is realized. In addition, when the side spoiler 100 is stowed in the lower part 10 of the vehicle by the power transfer unit 200, the ground clearance of the mobility vehicle is secured, whereby damage to the side spoiler 100 is avoided.

Here, the power transfer unit 200 may be controlled by the controller 300, and when the controller 300 determines the rotational position of the side spoiler 100 according to the driving state of the mobility vehicle and road information, the power transfer unit 200 may control the rotational position of the side spoiler 100 according to a command of the controller 300.

In particular, the controller 300 may individually control the plurality of side spoilers 100 according to the driving state and road information of the mobility vehicle, thereby optimizing aerodynamic performance for each driving situation.

When describing the present disclosure described above in detail, as shown in FIGS. 2 to 3, the side spoiler 100 may include a first plate 110 and a second plate 120, wherein the first plate 110 is installed to be able to rotate in the lower part 10 of the vehicle and connected to the power transfer unit 200, and the second plate 120 is connected to be able to rotate to the first plate 110.

Figure 3:
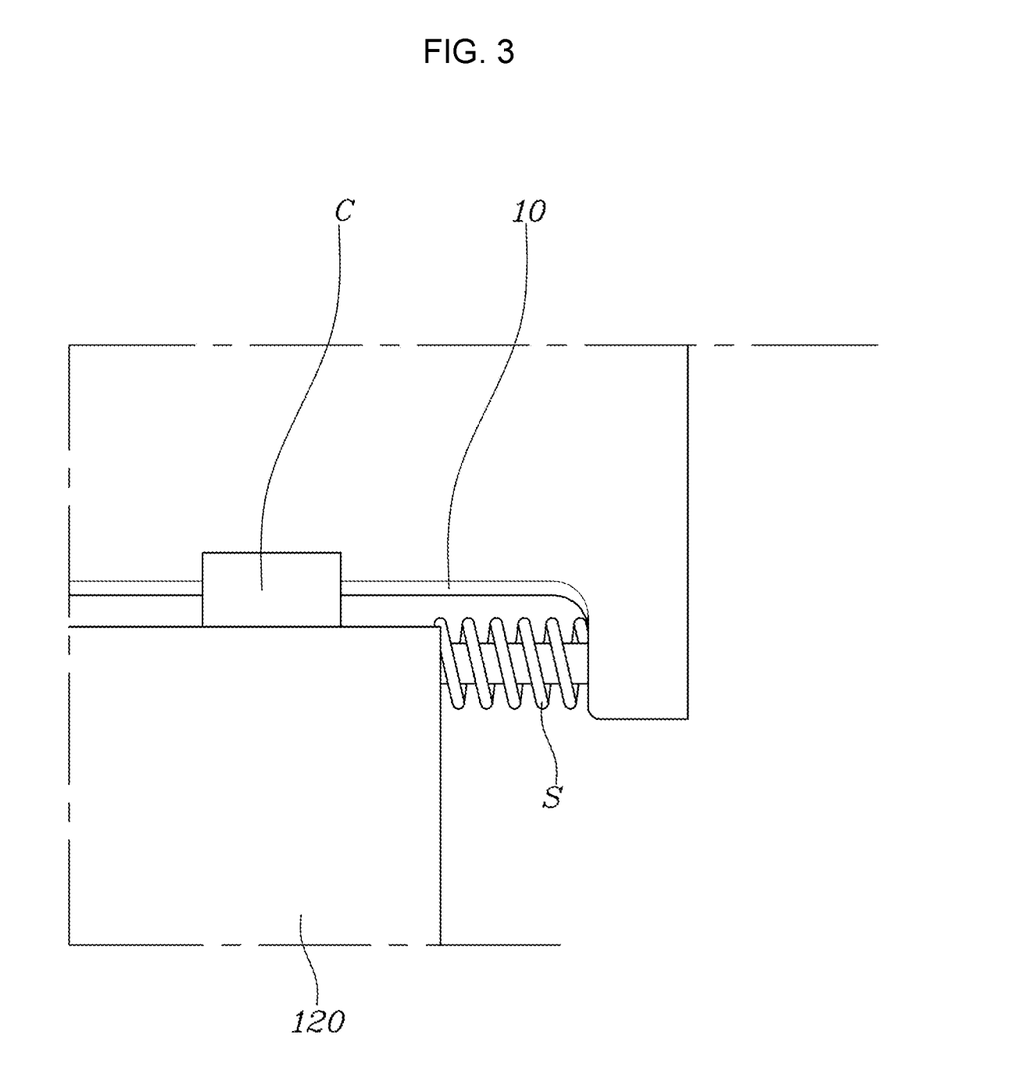
FIG. 3 is a view explaining the side spoiler according to the present disclosure.

That is, the side spoiler 100 may include the first plate 110 and the second plate 120 connected to be able to rotate to each other.

Here, the first plate 110 may have one end connected to be able to rotate to the lower part 10 of the vehicle in a hinge structure and an opposite end connected to the power transfer unit 200, so that the rotational position is controlled by the power transfer unit 200.

The second plate 120 may be connected to be able to rotate to the first plate 110. Accordingly, the second plate 120 may be rotated at the first plate 110 to be folded with respect to the first plate 110 or may be unfolded from the first plate 110. Here, when spread from the first plate 110 and positioned to lie on a straight line with the first plate 110, the second plate 120 may be configured such that a corresponding position is fixed, and an unfolded state is maintained. Accordingly, an engaging structure C may be applied to a connection portion of the first plate 110 and the second plate 120.

In addition, the second plate 120 may be connected to be able to rotate to the first plate 110 through an elastic means S as a medium, so that an elastic force may be applied to the second plate 120 in a direction unfolded from the first plate 110. Here, the elastic means S may be composed of a spring and, by being connected to the first plate 110 and the second plate 120, apply the elastic force in the direction unfolded from the first plate 110, whereby the second plate 120 is operated in a direction unfolded at normal times from the first plate 110.

Through this, when stowed in the lower part 10 of the vehicle, the side spoiler 100 may be stowed smoothly in the lower part 10 of the vehicle, as the second plate 120 is rotated in the direction folded at the first plate 110 while being in contact with the lower part 10.

In addition, when the side spoiler 100 is deployed, the first plate 110 and the second plate 120 may be exposed from the lower part 10 of the vehicle, and the second plate 120 may be rotated in the direction unfolded by the elastic force of the elastic means S, thereby being spread in a straight line from the first plate 110 to control the air flow flowing to the lower part of the mobility vehicle.

Figure 4:
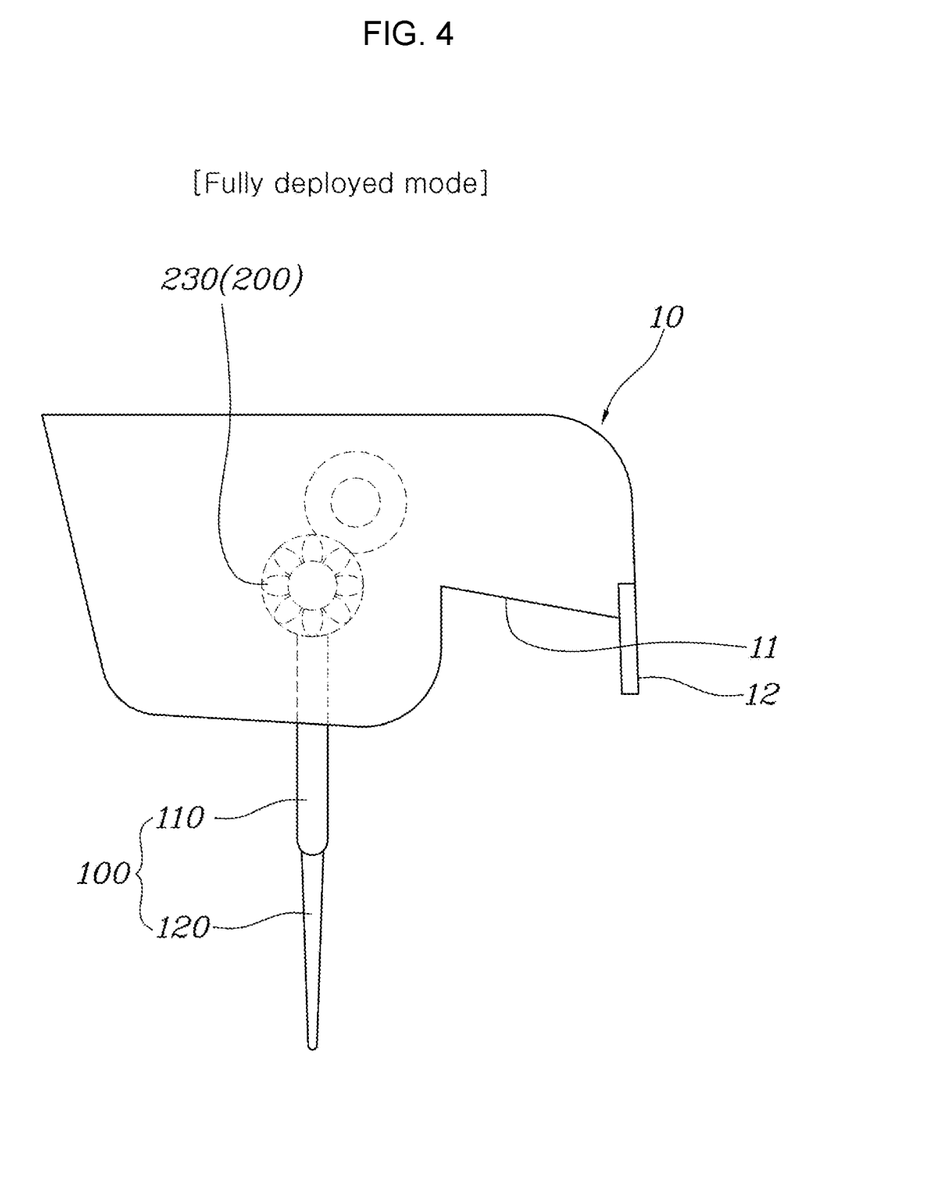
FIG. 4 is a view showing a fully deployed mode of the side spoiler device according to the present disclosure.

In detail, an accommodation space 11 in which the side spoiler 100 is stowed may be provided in the lower part 10 of the vehicle body, an engaging end 12 may be provided outside the accommodation space 11, the first plate 110 may be provided to be able to be stowed in the accommodation space 11, and depending on the rotational position of the first plate 110, the second plate 120 may be unfolded from the first plate 110 or tilted, by being in contact with the engaging end 12, from the first plate 110.

As shown in FIG. 4, the accommodation space 11 may be provided by being depressed in the lower part 10 of the vehicle body so that the side spoiler 100 is to be stowed. The engaging end 12 is provided on the outside of the accommodation space 11 in the lower body 10 of such a mobility vehicle, thereby interacting with the second plate 120 of the side spoiler 100 so that the side spoiler 100 may be stowed or deployed.

That is, the first plate 110 may be provided to be stowed in the accommodation space 11 in the lower part 10 of the vehicle body, whereby interference with the engaging end 12 is avoided during rotation by the power transfer unit 200. The second plate 120 connected to the first plate 110 is provided to extend from the first plate 110 and is brought into contact with the engaging end 12 according to the rotational position of the first plate 110, thereby being operated to be folded or unfolded from the first plate 110 depending on whether or not being brought into contact with the engaging end 12.

Figure 6:
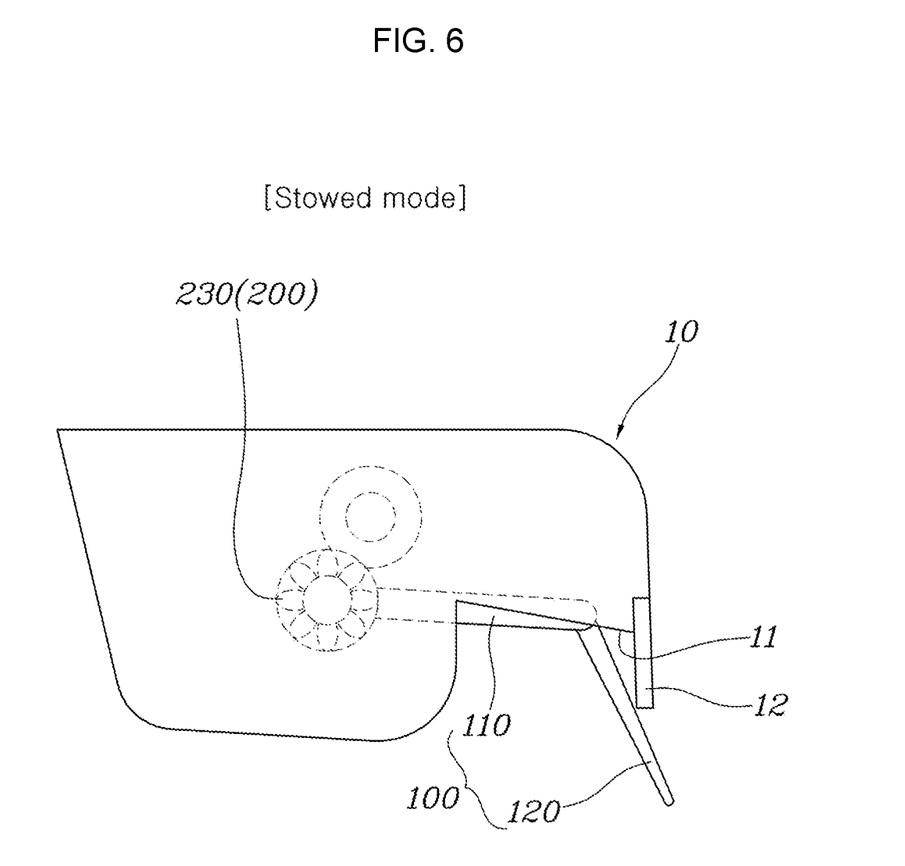
FIG. 6 is a view showing a stowed mode of the side spoiler device according to the present disclosure.

Therefore, when the side spoiler 100 is being stowed, the second plate 120 may be brought into contact with the engaging end 12, thereby being folded to the first plate 110 by being bent, and when the side spoiler 100 is being deployed, the second plate 120 may be separated from the engaging end 12 and unfolded from the first plate 110.

That is, as shown in FIG. 4, when the first plate 110 is rotated downward, a state in which the second plate 120 is unfolded from the first plate 110 may be maintained.

Figure 5:
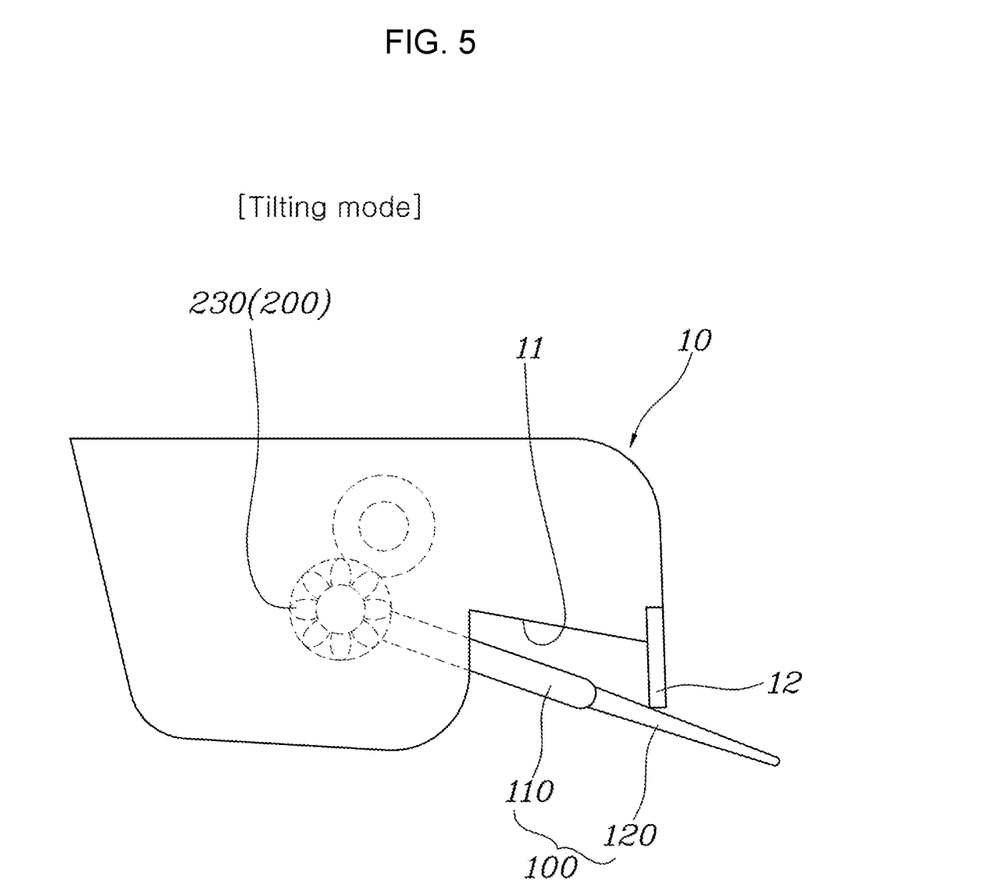
FIG. 5 is a view showing a tilting mode of the side spoiler device according to the present disclosure.

Here, as shown in FIG. 5, when the first plate 110 is rotated at the predetermined angle, as the rotational position is changed in a state in which the second plate 120 is unfolded together with the first plate 110, the air flow may be controlled through the first plate 110 and the second plate 120, and damage to the first plate 110 and the second plate 120 may be avoided through a change in ground clearance.

As shown in FIG. 6, when the first plate 110 is rotated so as to be stowed in the accommodation space 11 of the lower part 10 of the vehicle body, the second plate 120 may be brought into contact with the engaging end 12. Accordingly, the second plate 120 is rotated from the first plate 110 and folded on the first plate 110, so that the second plate 120 may be stowed together with the first plate 110 in the accommodation space 11 of the lower part 10 of the vehicle body.

Meanwhile, the first plate 110 may be composed of a rigid material, and the second plate 120 may be composed of a soft material. That is, the first plate 110 is composed of a rigid material so as to support the second plate 120 in a state of being installed on the lower part 10 of the vehicle body, and the second plate 120 is composed of a soft material so as to absorb impact caused by contact with a road surface or debris present on the road surface.

On the other hand, as shown in FIG. 2, the power transfer unit 200 may include a driver 210 installed in the lower part 10 of the vehicle body and generating rotational power, a power shaft 220 connected to the driver 210 to rotate, and a gear unit 230 connected in gears to the power shaft 220 and the side spoiler 100 so that the side spoiler 100 is rotated by the rotational power of the driver 210.

As such, the power transfer unit 200 may include the driver 210, a power shaft 220, and a gear unit 230, wherein the driver 210 is an electric motor and generates rotational power in a forward or reverse direction. The power shaft 220 rotated by receiving the rotational power extends to the driver 210, and the power shaft 220 may be connected to the side spoiler 100 with the gear unit 230 as a medium, thereby controlling the rotational position of the spoiler 100 when the driver 210 is operated. In addition, the gear unit 230 connecting the power shaft 220 and the side spoiler 100 is configured to engage with a plurality of gears, so that the rotational position of the side spoiler 100 may be precisely adjusted, and the operability of the gear unit 230 may be secured.

The side spoiler 100 according to the present disclosure described above may be configured to be in the plurality of side spoilers, and each side spoiler 100 may be individually controlled, whereby optimized control according to driving conditions and road surface conditions may be performed.

That is, in the present disclosure, the side spoiler 100 may be configured to be divided into at least one front side spoiler 100a and at least one rear side spoiler 100b in the longitudinal direction of the mobility vehicle. Of course, in the case of the side spoiler 100, it may be additionally configured in addition to the front side spoiler 100a and the rear side spoiler 100b, but desired aerodynamic performance of the mobility vehicle may be sufficiently secured by dividing the side spoiler 100 only into the front side spoiler 100a and the rear side spoiler 100b. The number of divisions of the side spoiler 100 is not limited to the corresponding embodiment, and additionally, the number of the side spoilers 100 may be further configured.

Accordingly, the controller 300 may control the front side spoiler 100a and the rear side spoiler 100b, respectively, thereby performing the control of the side spoiler 100 optimized for the driving state of the mobility vehicle and for the road surface state in the direction in which the mobility vehicle is driven.

Specifically, the controller 300 may divide the front side spoiler 100a and the rear side spoiler 100b by a control mode, wherein the control mode is set into a stowed mode in which the front side spoiler 100a and the rear side spoiler 100b are stowed, a fully deployed mode in which the front side spoiler 100a and the rear side spoiler 100b are deployed vertically downward, and a tilting mode in which the front side spoiler 100a and the rear side spoiler 100b are deployed to be inclined at the predetermined angle.

As such, the controller 300 may subdivide the control mode of the side spoiler 100 to perform control of the side spoiler 100 suitable for a driving state and a road surface state.

Here, in the stowed mode, the front side spoiler 100a and the rear side spoiler 100b may be stowed in the lower part 10 of the vehicle body, so that the ground clearance is maximized.

In the fully deployed mode, the front side spoiler 100a and the rear side spoiler 100b may be rotated downward and deployed, at the lower part 10 of the vehicle body, and as the front side spoiler 100a and the rear side spoiler 100b are positioned vertically on the lower part 10 of the vehicle body, the aerodynamic performance according to the air flow may be secured.

In the tilting mode, the front side spoiler 100a and the rear side spoiler 100b may be deployed to be inclined at a predetermined angle, and the front side spoiler 100a and the rear side spoiler 100b may be maintained in the deployed state while being controlled to be positioned upward, whereby the ground clearance is secured. Through this, the controller 300 may set the front side spoiler 100a and the rear side spoiler 100b to be in a state optimized for driving the mobility vehicle according to the driving state and the road surface state. In the tilting mode, the inclination angles of the front side spoiler 100a and the rear side spoiler 100b may be determined by being optimized for each situation according to driving situations or road surface conditions.

Figure 7:
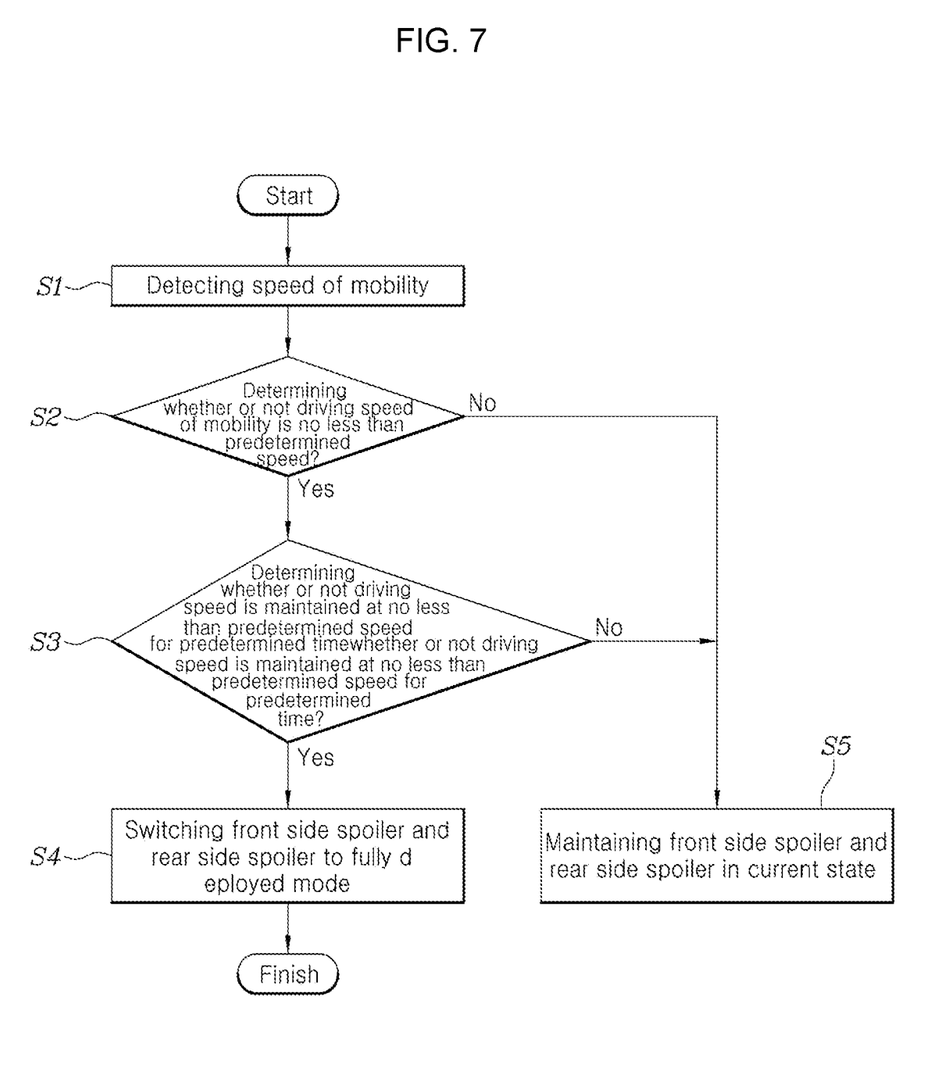
FIG. 7 is a flowchart showing control according to a driving speed of the side spoiler device according to the present disclosure.

To specifically describe the controller 300, driving speed information of the mobility vehicle may be input to the controller 300, and, when the driving speed of the mobility vehicle is no less than a predetermined speed, the controller 300 may control the power transfer unit 200 so that the front side spoiler 100a and the rear side spoiler 100b are operated in the fully deployed mode.

That is, the driving speed of the mobility vehicle may be input to the controller 300 through the wheel sensor or the speed sensor, and when the driving speed of the mobility vehicle is no less than the predetermined speed, the controller 300 may cause the front side spoiler 100a and the rear side spoiler 100b to be operated in the fully deployed mode, thereby causing downforce suitable for high-speed driving to be provided by causing the air flow to be controlled through the front side spoiler 100a and the rear side spoiler 100b.

Here, the predetermined speed set in the controller 300 is a speed, at which desired aerodynamic performance is realized through the operation of the side spoiler 100 during driving of the mobility vehicle and which is derived through an experiment in advance, and may be set in various ways depending on the mobility vehicle.

That is, as shown in FIG. 7, the controller 300 may perform step S1 of detecting the speed of the mobility vehicle, step S2 of determining whether or not the driving speed of the mobility vehicle is no less than the predetermined speed, and step S3 of determining whether or not the driving speed is maintained at no less than the predetermined speed for a predetermined time.

Through this, when the driving speed of the mobility vehicle is maintained no less than the predetermined speed, the controller 300 may perform step S4 of operating the front side spoiler 100a and the rear side spoiler 100b in the fully deployed mode, and when the driving speed of the mobility vehicle is not maintained at no less than the predetermined speed and is decelerated, step S5 of maintaining the front side spoiler 100a and the rear side spoiler 100b in the current state may be performed.

Figure 8:
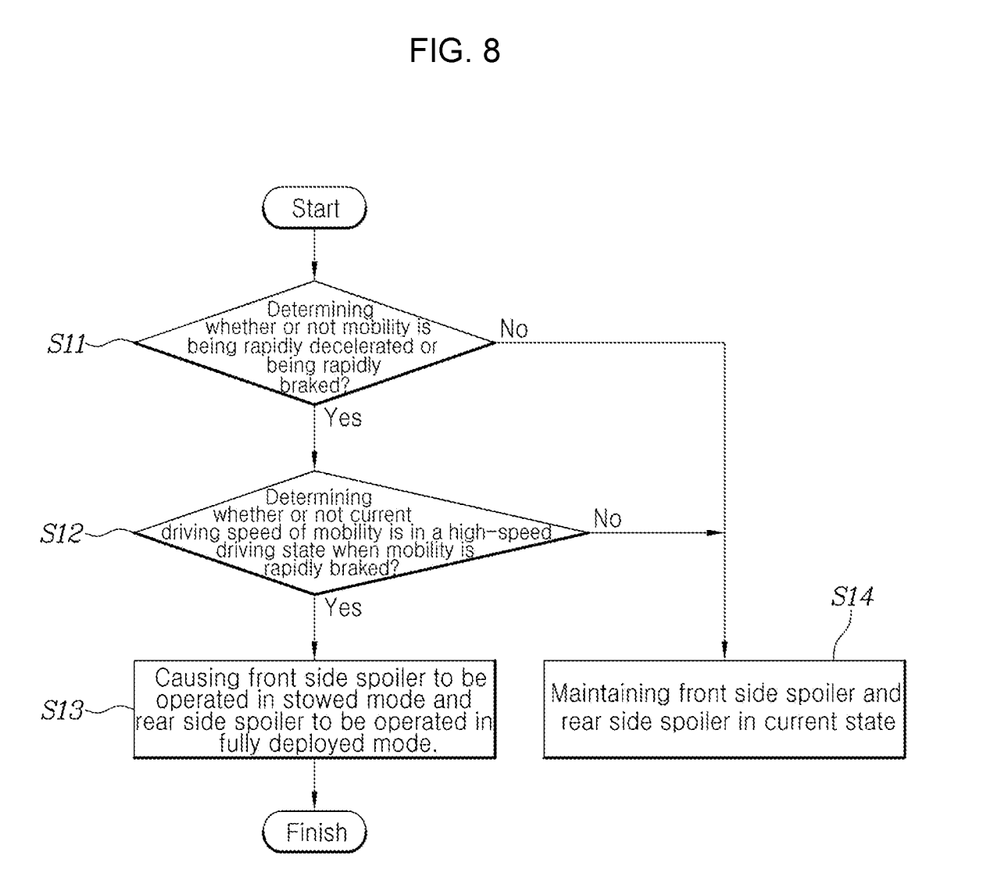
FIG. 8 is a flowchart showing control according to a braking situation of the side spoiler device according to the present disclosure.

On the other hand, the driving speed information of the mobility vehicle may be input to the controller 300, and when the driving speed of the mobility vehicle is rapidly decelerated, the controller 300 may control the power transfer unit 200 so that the front side spoiler 100a and the rear side spoiler 100b are operated in the stowed mode and the fully deployed mode, respectively.

That is, whether or not to brake is input to the controller 300 through the brake sensor, and when the mobility vehicle is rapidly decelerated, the controller 300 may cause the front side spoiler 100a to be operated in the stowed mode and the rear side spoiler 100b to be operated in the fully deployed mode, whereby air brakes are implemented using the air flow.

As such, when the front side spoiler 100a is operated in the stowed mode and the rear side spoiler 100b is operated in the fully deployed mode while the mobility vehicle is being driven, the air flow is dispersed in front of the mobility vehicle and air flow resistance is created. Through this, the controller 300 implements the air brake during sudden deceleration of the mobility vehicle, thereby improving the braking performance of the mobility vehicle.

That is, as shown in FIG. 8, the controller 300 may perform step S11 of determining whether or not the mobility vehicle is being rapidly decelerated or being rapidly braked and step S12 of determining whether or not the current driving speed of the mobility vehicle is in a high-speed driving state when the mobility vehicle is rapidly braked.

Here, when it is confirmed that the mobility vehicle is suddenly braked in the high-speed driving state, the controller 300 performs step S13 of causing the front side spoiler 100a to be operated in the stowed mode and the rear side spoiler 100b to be operated in the fully deployed mode and, when the mobility vehicle is not high-speed driving or not a sudden braking situation, the controller 300 performs step S14 of maintaining the front side spoiler 100a and the rear side spoiler 100b in the current state.

Figure 9:
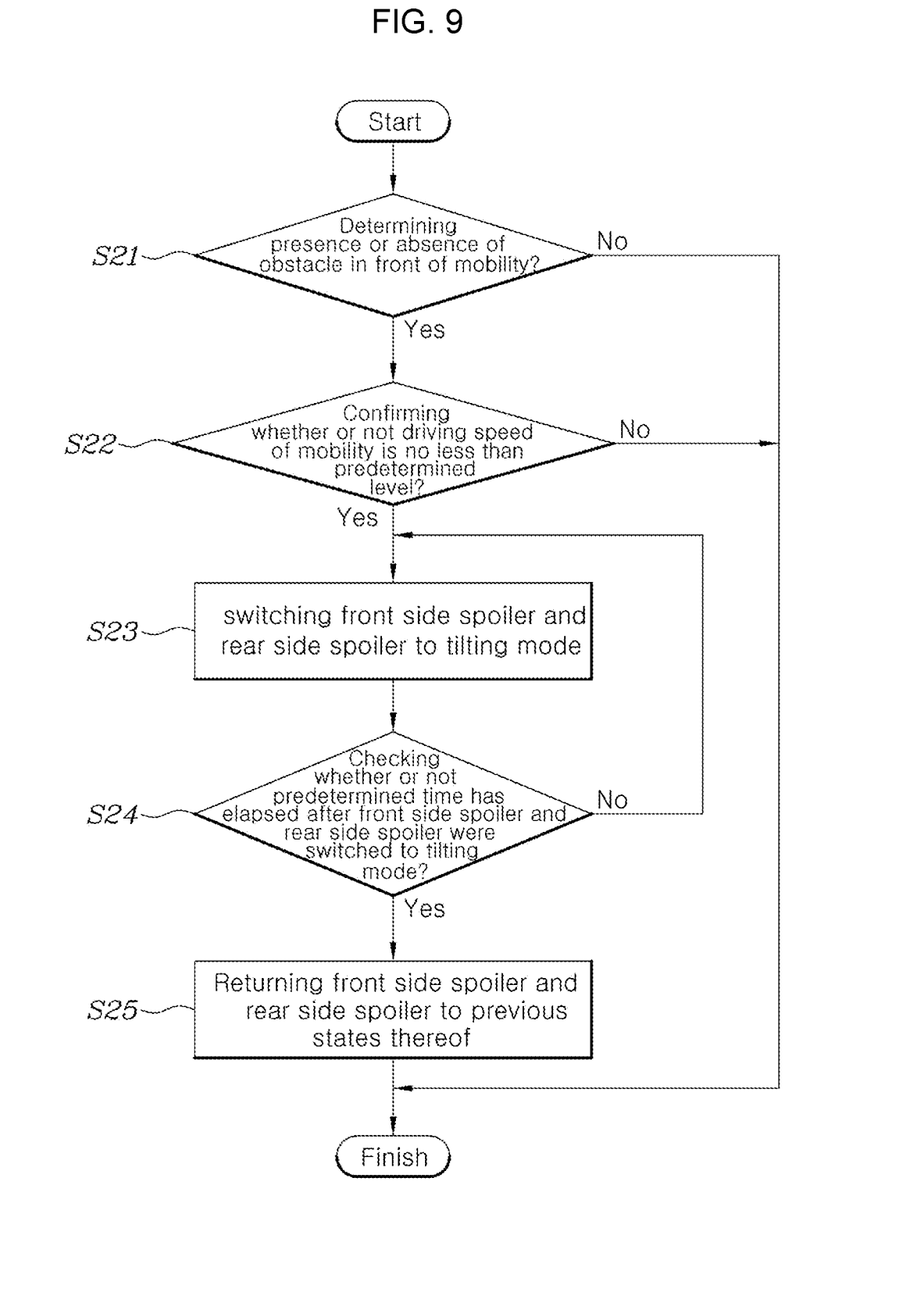
FIG. 9 is a flowchart showing control according to an obstacle confirmation situation of the side spoiler device according to the present disclosure.

On the other hand, the road condition information in front of the mobility vehicle may be input to the controller 300, and in the state in which the front side spoiler 100a and the rear side spoiler 100b are deployed, when there is an obstacle including a mound on the road in the moving direction of the mobility vehicle, the controller 300 may control the power transfer unit 200 so that the front side spoiler 100a and the rear side spoiler 100b operate in the tilting mode.

That is, the controller 300 may receive information from the camera sensor or GPS, thereby determining the road condition in the driving direction of the mobility vehicle. Here, the controller 300 checks whether or not the front side spoiler 100a and the rear side spoiler 100b are in the deployed state. In addition, when there is the obstacle including a mound on the road in the moving direction of the mobility vehicle in the state in which the front side spoiler 100a and the rear side spoiler 100b are deployed, the controller 300 causes the front side spoiler 100a and the rear side spoiler 100b to be operated in the tilting mode, so that the front side spoiler 100a and the rear side spoiler 100b are avoided to be brought into contact with the road surface or the obstacle.

In this way, when the front side spoiler 100a and the rear side spoiler 100b are switched to the tilting mode, the ground clearance of the mobility vehicle may be secured, whereby the front side spoiler 100a and the rear side spoiler 100b are avoided to be brought into contact with the road surface or the obstacle. In addition, in the case of the tilting mode, the front side spoiler 100a and the rear side spoiler 100b are not stowed in the lower part 10 of the vehicle body but are rotated only at the predetermined angle, thereby being able to be quickly returned to the previously deployed positions thereof.

That is, as shown in FIG. 9, the controller 300 may perform step S21 of determining the presence or absence of the obstacle such as the mound in front of the mobility vehicle and step S22 of confirming the driving speed of the mobility vehicle.

Through this, when the obstacle exists in front of the mobility vehicle and the driving speed of the mobility vehicle is no less than the predetermined level, the controller 300 may perform step S23 of switching the front side spoiler 100a and the rear side spoiler 100b to the tilting mode.

Thereafter, the controller 300 may perform step S24 of checking whether or not a predetermined time has elapsed after the front side spoiler 100a and the rear side spoiler 100b were switched to the tilting mode. Performing step S24 is for checking whether or not the mobility vehicle has passed through the obstacle such as the mound.

Through this, when the predetermined time has elapsed, the controller 300 may perform step S25 of returning the front side spoiler 100a and the rear side spoiler 100b to the previous states thereof.

Figure 10:
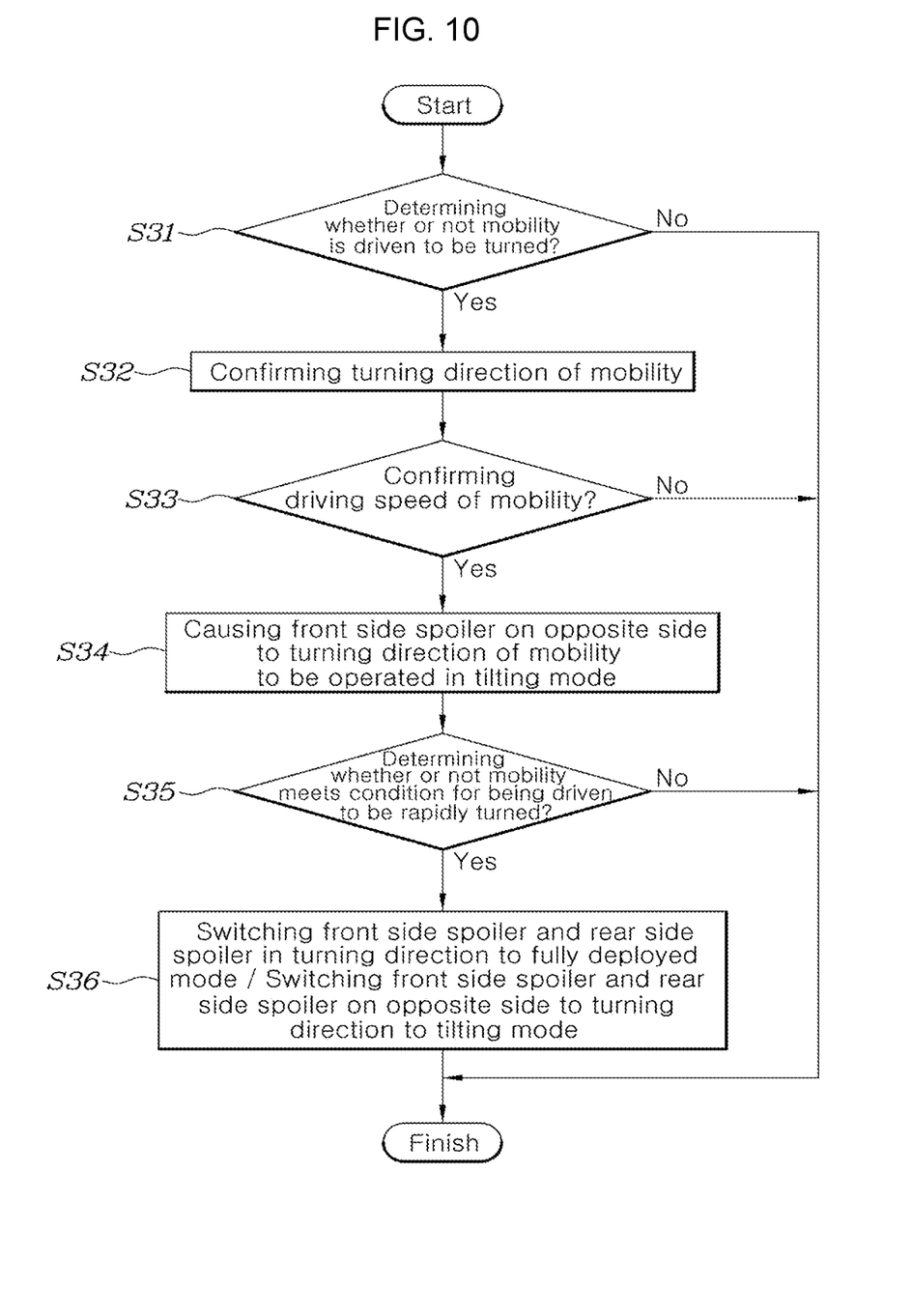
FIG. 10 is a flowchart showing control according to a turning driving situation of the side spoiler device according to the present disclosure.

On the other hand, when the mobility vehicle is driven to be turned in the state in which the front side spoiler 100a and the rear side spoiler 100b are deployed, the controller 300 may control the power transfer unit 200 so that the front side spoiler 100a on an opposite side to a turning direction is operated in the tilting mode.

That is, information on a turning of the mobility vehicle may be input to the controller 300 through the steering wheel sensor, and when the mobility vehicle is driven to be turned, the controller 300 may control individually each of the front side spoilers 100a and the rear side spoilers 100b, which are provided on opposite sides of the mobility vehicle, according to the turning posture of the mobility vehicle.

That is, when the mobility vehicle is driven to be turned in a state in which the front side spoiler 100a and the rear side spoiler 100b are deployed, the controller 300 may cause the front side spoiler 100a on the opposite side to the turning direction to be operated in the tilting mode.

For example, when driven to be turned in the right direction, the mobility vehicle is tilted to the left side thereof due to inertia. In particular, during the mobility vehicle is driven to be turned in the right direction, the load is concentrated on the left front side of the mobility vehicle. At this time, when the front side spoiler 100a and the rear side spoiler 100b on the left side of the mobility vehicle are in the fully deployed mode, as the posture of the mobility vehicle is tilted to the left side, the front side spoiler 100a on the left side may be brought into contact with the road surface. Therefore, the controller 300 causes the front side spoiler 100a on the left side to be operated in the tilting mode when the mobility vehicle is driven to be turned in the right direction.

Due to this, the mobility vehicle may respond to a change in ground clearance due to the posture tilted to one side during being driven to be turned, so that damage to the side spoiler 100 may be avoided.

In addition, when the driving speed and turning angle of the mobility vehicle meet a preset condition for being driven to be rapidly turned, the controller 300 may control the power transfer unit 200, so that the front side spoiler 100a and the rear side spoiler 100b in the turning direction are operated in the fully deployed mode, and the front side spoiler 100a and the rear side spoiler 100b on the opposite side to the turning direction are operated in the tilting mode.

Here, the condition for being driven to be rapidly turned is a condition in which the driving speed and the turning angle during driving of the mobility vehicle may make the posture of the mobility vehicle unstable and may be set according to the driving speed and the turning angle of the mobility vehicle. In particular, when the mobility vehicle meets the condition for being driven to be rapidly turned, a phenomenon further increases such that the posture of the mobility vehicle is tilted to the opposite side to the turning direction.

Therefore, when the mobility vehicle meets the condition for being driven to be rapidly turned, the controller 300 may cause the front side spoiler 100a and the rear side spoiler 100b on the side in the turning direction to be operated in the fully deployed mode to provide the downforce to be generated and the front side spoiler 100a and the rear side spoiler 100b on the opposite side to the turning direction to be operated in the tilting mode to avoid contact with the road surface by securing the ground clearance.

That is, as shown in FIG. 10, the controller 300 may performs step S31 of determining whether or not the mobility vehicle is driven to be turned and step S32 of determining the turning direction of the mobility vehicle.

Here, the controller 300 may further perform step S33 of confirming the driving speed of the mobility vehicle, thereby causing the following control to be performed in a situation in which the mobility vehicle is driven at a high speed.

Through this, when the mobility vehicle is driven to be turned, the controller 300 may perform step S34 of causing the front side spoiler 100a on the opposite side to the turning direction of the mobility vehicle to be operated in the tilting mode.

Additionally, the controller 300 may further perform step S35 of determining whether or not the mobility vehicle meets the condition for being driven to be rapidly turned and, when the condition for being driven to be rapidly turned is met, and may perform step S36 of causing the front side spoiler 100a and the rear side spoiler 100b on the opposite side to the turning direction to be operated in the tilting mode. Consequentially, the mobility vehicle is stably driven to be turned.

In the device of the side spoiler 100 for mobility vehicle having the structure described above, a side spoiler 100 may be provided in the lower part side of the side surface of the mobility vehicle to improve aerodynamic performance and, by controlling the deployment angle of the side spoiler 100 according to driving conditions and road conditions, desired aerodynamic performance is realized, and damage to the side spoiler 100 is prevented. In addition, the side spoiler 100 is divided into the plurality of side spoilers, so aerodynamic performance is optimized for each driving situation through individual control of each side spoiler 100.

Although the present disclosure has been shown and described in relation to specific embodiments, it will be obvious to those of ordinary skill in the art that the present disclosure may be variously improved and changed without departing from the technical spirit of the present disclosure provided by the following claims.

What is claimed is:

1. A side spoiler device for a mobility vehicle, the device comprising:
   a side spoiler installed to be able to rotate in a lower part of a vehicle body of the mobility vehicle, deployed or stowed in the lower part of a vehicle body and divided into a plurality of side spoilers along a longitudinal direction of the mobility vehicle;
   a power transfer unit installed in the lower part of a vehicle body, configured to be in a plurality of power transfer units to be connected to each side spoiler, and configured to control a rotational position of the side spoiler; and
   a controller configured to control the power transfer unit and to determine a position of each side spoiler;
   wherein the side spoiler extends along the longitudinal direction of the mobility vehicle between a front tire and a rear tire of the lower part of the vehicle body.

2. The device of claim 1, wherein:
   the side spoiler comprises a first plate and a second plate,
   the first plate is installed to be able to rotate in the lower part of a vehicle and connected to the power transfer unit, and
   the second plate is connected to be able to rotate to the first plate.

3. The device of claim 2, wherein:
   an accommodation space in which the side spoiler is stowed is provided in the lower part of a vehicle body,
   an engaging end is provided outside the accommodation space,
   the first plate is provided to be able to be stowed in the accommodation space, and depending on the rotational position of the first plate, the second plate is unfolded from the first plate or is tilted, by being in contact with the engaging end, from the first plate.

4. The device of claim 2, wherein the second plate is connected to be able to rotate to the first plate through an elastic means as a medium, whereby an elastic force is applied to the second plate in a direction unfolded from the first plate.

5. The device of claim 3, wherein:
based on the side spoiler being stowed, the second plate is brought into contact with the engaging end, thereby being folded to the first plate by being bent, and
based on the side spoiler being deployed, an angle of the first plate is controlled in a state in which the second plate is separated from the engaging end and unfolded from the first plate.

6. The device of claim 2, wherein the first plate is composed of a rigid material, and the second plate is composed of a soft material.

7. The device of claim 1, wherein the power transfer unit comprises:
a driver installed in the lower part of a vehicle body and generating rotational power,
a power shaft connected to the driver to rotate, and
a gear unit connected in gears to the power shaft and the side spoiler so that the side spoiler is rotated by the rotational power of the driver.

8. The device of claim 1, wherein:
the side spoiler is configured to be divided into at least one front side spoiler and at least one rear side spoiler in the longitudinal direction of the mobility vehicle, and
the controller controls the front side spoiler and the rear side spoiler, respectively.

9. The device of claim 8, wherein:
the controller divides the front side spoiler and the rear side spoiler by a control mode, and
the control mode is set into a stowed mode in which the front side spoiler and the rear side spoiler are stowed, a fully deployed mode in which the front side spoiler and the rear side spoiler are deployed vertically downward, and a tilting mode in which the front side spoiler and the rear side spoiler are deployed to be inclined at a predetermined angle.

10. The device of claim 9, wherein:
driving speed information of the mobility vehicle is input to the controller, and
when driving speed of the mobility vehicle is no less than a predetermined speed, the controller controls the power transfer unit so that the front side spoiler and the rear side spoiler are operated in the fully deployed mode.

11. The device of claim 9, wherein:
the driving speed information of the mobility vehicle is input to the controller, and
based on the driving speed of the mobility vehicle being rapidly decelerated, the controller controls the power transfer unit so that the front side spoiler and the rear side spoiler are operated in the stowed mode and the fully deployed mode, respectively.

12. The device of claim 9, wherein:
road condition information in front of the mobility vehicle is input to the controller, and
in the state in which the front side spoiler and the rear side spoiler are deployed, when there is an obstacle including a mound on a road in a moving direction of the mobility vehicle, the controller controls the power transfer unit so that the front side spoiler and the rear side spoiler are each operated in an optimal tilting mode.

13. The device of claim 9, wherein, based on the mobility vehicle being driven to be turned in the state in which the front side spoiler and the rear side spoiler are deployed, the controller controls the power transfer unit so that the front side spoiler on an opposite side to a turning direction is operated in an optimal tilting mode.

14. The device of claim 13, wherein, when the driving speed and turning angle of the mobility vehicle meet a preset condition for being driven to be rapidly turned, the controller controls the power transfer unit, so that the front side spoiler and the rear side spoiler in the turning direction are operated in the fully deployed mode, and the front side spoiler 100*a* and the rear side spoiler 100*b* on an opposite side to the turning direction are each operated in the optimal tilting mode.

15. The device of claim 10, wherein the driving speed information of the mobility vehicle is input to the controller through a wheel sensor or a speed sensor.

16. The device of claim 11, wherein whether or not to brake is input to the controller through a brake sensor.

17. The device of claim 12, wherein the road condition is input to the controller from a camera sensor or GPS.

18. The device of claim 13, wherein information on a turning of the mobility vehicle is input to the controller through a steering wheel sensor.

19. A side spoiler device for a mobility vehicle, the device comprising:
a side spoiler installed to be able to rotate in a lower part of a vehicle body of the mobility vehicle, deployed or stowed in the lower part of a vehicle body and divided into a plurality of side spoilers along a longitudinal direction of the mobility vehicle;
a power transfer unit installed in the lower part of a vehicle body, configured to be in a plurality of power transfer units to be connected to each side spoiler, and configured to control a rotational position of the side spoiler; and
a controller configured to control the power transfer unit and to determine a position of each side spoiler;
wherein the side spoiler comprises a first plate and a second plate,
wherein the first plate is installed to be able to rotate in the lower part of a vehicle and connected to the power transfer unit, and
wherein the second plate is connected to be able to rotate to the first plate.

20. A side spoiler device for a mobility vehicle, the device comprising:
a side spoiler installed to be able to rotate in a lower part of a vehicle body of the mobility vehicle, deployed or stowed in the lower part of a vehicle body and divided into a plurality of side spoilers along a longitudinal direction of the mobility vehicle;
a power transfer unit installed in the lower part of a vehicle body, configured to be in a plurality of power transfer units to be connected to each side spoiler, and configured to control a rotational position of the side spoiler; and
a controller configured to control the power transfer unit and to determine a position of each side spoiler;
wherein the power transfer unit comprises:
a driver installed in the lower part of a vehicle body and generating rotational power,
a power shaft connected to the driver to rotate, and a gear unit connected in gears to the power shaft and the side spoiler so that the side spoiler is rotated by the rotational power of the driver.

\* \* \* \* \*